United States Patent [19]

Kramlinger

[11] Patent Number: 5,433,103

[45] Date of Patent: Jul. 18, 1995

[54] METHOD OF CALIBRATION FOR VOLUMETRIC BLENDING

[75] Inventor: Philip J. Kramlinger, Arden Hills, Minn.

[73] Assignee: Kramlinger-Furlong, Inc., Minneapolis, Minn.

[21] Appl. No.: 93,284

[22] Filed: Aug. 17, 1993

[51] Int. Cl.6 ............................................. G01F 25/00
[52] U.S. Cl. ................................................... 73/3
[58] Field of Search ....................................... 73/3

[56] References Cited

U.S. PATENT DOCUMENTS 4,667,503  5/1987  Loos ............................................. 73/3

Primary Examiner—Thomas P. Noland
Attorney, Agent, or Firm—Patterson & Keough

[57] ABSTRACT

Calibration method for volumetric blending especially adapted to calibrate the volumetric blending equipment according to the movement of the dispensing mechanism relative to the volumetric units dispensed. The method broadly includes the steps of initiating the movement of a dispensing mechanism, counting a predetermined number of volumetric units as the dispensing mechanism moves, measuring and recording the quantity of the ingredient dispensed for predetermined unit count of said dispensing mechanism and then calculating a calibration ratio of ingredient quantity to movement of the dispensing mechanism. The calibration ratio remains constant for the ingredient dispensed and regardless of the speed of the dispensing mechanism.

6 Claims, 2 Drawing Sheets

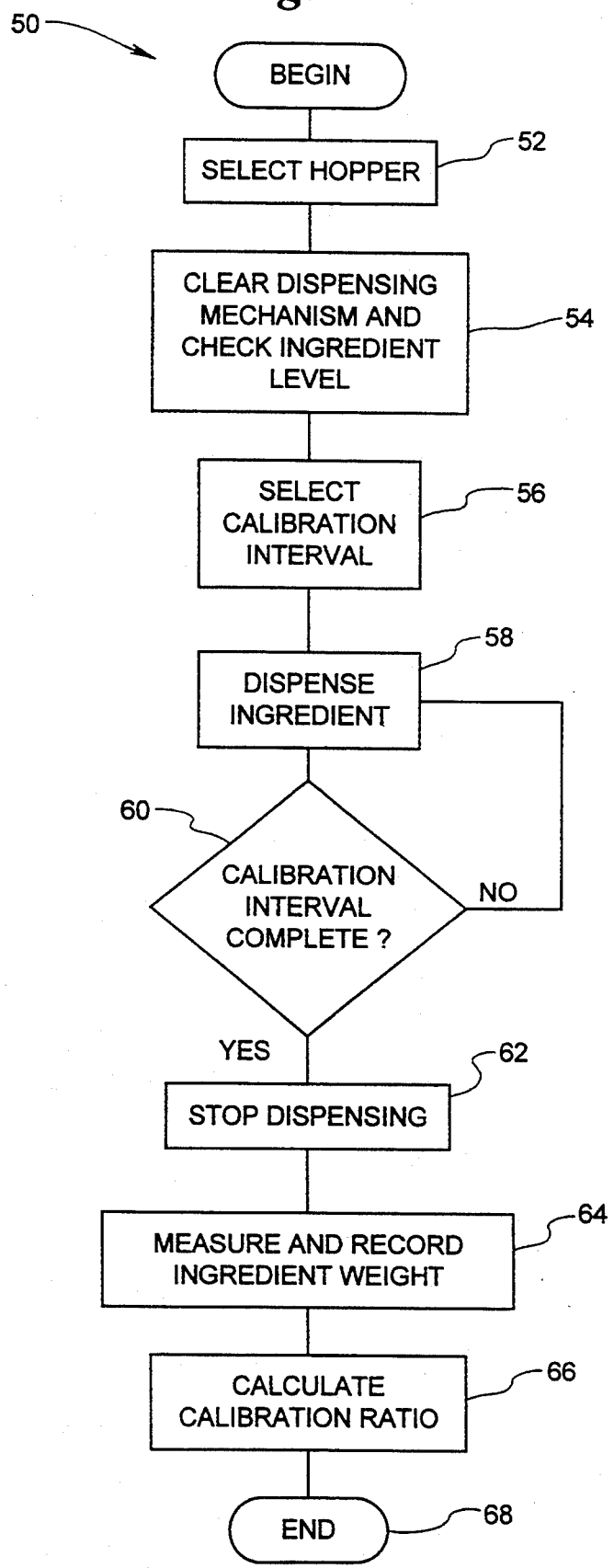

METHOD OF CALIBRATION FOR VOLUMETRIC BLENDING

FIELD OF THE INVENTION

The present invention broadly relates to the field of volumetric blending equipment for mixing quantities of ingredients. More specifically, the present invention relates to an improved method for calibrating such equipment to insure that ingredients are added to the mixture in the correct proportions.

BACKGROUND OF THE INVENTION

There are two common methods for blending large amounts of ingredients into the desired mixture. One method is batch mixing. Batch mixing is the process of sequentially adding the ingredients together in their proper proportions and then agitating the ingredients to produce a mixture of uniform ingredient consistency. This is typically done by weighing into a scale. A well known example of batch mixing is a concrete mixing truck. However, batch mixing is time intensive and requires large, expensive equipment. A second method is volumetric blending. Volumetric blending involves sequentially or simultaneously adding ingredients to central container according to the desired proportions of each ingredient such that, at the end of the mixing, the central container holds a homogeneous mixture. Compared to batch mixing, volumetric blending is less expensive, less time intensive and does not require as much physical area as batch mixing. However, calibration of a volumetric blending equipment must be accurate to ensure that the correct proportion of each ingredient is added to the mixture.

One method of calibration is disclosed in U.S. Pat. No. 4,667,503, titled "Method of Calibrating Volumetric Metering and Blending Device", issued May 26, 1987 to Bruce J. Loos and assigned to Monarch Specialty Systems, Inc. of Ossian, Ind. The Loos patent discloses calibration of volumetric continuous blending equipment by calculating the ratio of weight of each ingredient dispensed to the movement of dispensing augers for a small sample of the total mixture. A quantity of each ingredient is dispensed by the movement of dispensing augers to a weighing hopper until the weighing hopper measures a predetermined weight for each ingredient. The predetermined weight is the exact weight ratio of the ingredient in the desired mixture. Once this predetermined weight is reached, the equipment records the number of turns of the dispensing auger. The equipment is then calibrated by calculating the ratio of ingredient weight for each turn of the dispensing auger. Once the calibration is complete for each ingredient, the equipment then monitors the speed of all the dispensing augers as they feed into a common hopper to ensure each ingredient is added to the hopper mixture in the desired proportions.

The problem with the above method of calibration is that the equipment must be calibrated for each ingredient in each new mixture. This requires a sample run of each ingredient at the ratio of the new mixture and is both time and labor intensive. A calibration method that does not require a mixture sample run would be greatly appreciated.

SUMMARY OF THE INVENTION

The problems outlined above are in large measure solved by the improved volumetric blending calibration method in accordance with the present invention. The improved method is specially adapted to minimize the time, labor and ingredients necessary to calibrate the volumetric blending equipment while maximizing the precision of the calibration.

The calibration method in accordance with the present invention broadly includes the steps of initiating the movement of a dispensing auger, counting a predetermined number of volumetric units as the dispensing auger moves, measuring and recording the quantity of the ingredient dispensed for predetermined unit count of the dispensing auger and then calculating a calibration ratio of ingredient quantity to the movement of the dispensing auger. Because the calibration ratio is based on the movement of the dispensing auger, the calibration ratio remains regardless of the speed of the dispensing auger or the total amount of ingredient dispensed.

This calibration ratio can be used to calculate the total movement of the dispensing auger required to dispense a predetermined total quantity of each ingredient by weight as a portion of a mix. Once the total movement required is known, the dispensing auger can be timed to dispense the predetermined quantity of ingredient simultaneously with the movement of other dispensing augers. Alternatively, the dispensing augers can be timed to dispense the ingredients sequentially into the mix.

BRIEF DESCRIPTION OF THE DRAWINGS

FIG. 2 is a flowchart illustrating the general steps in calibrating a volumetric blending system in accordance with the present invention.

DETAILED DESCRIPTION OF THE INVENTION

Figure 1:
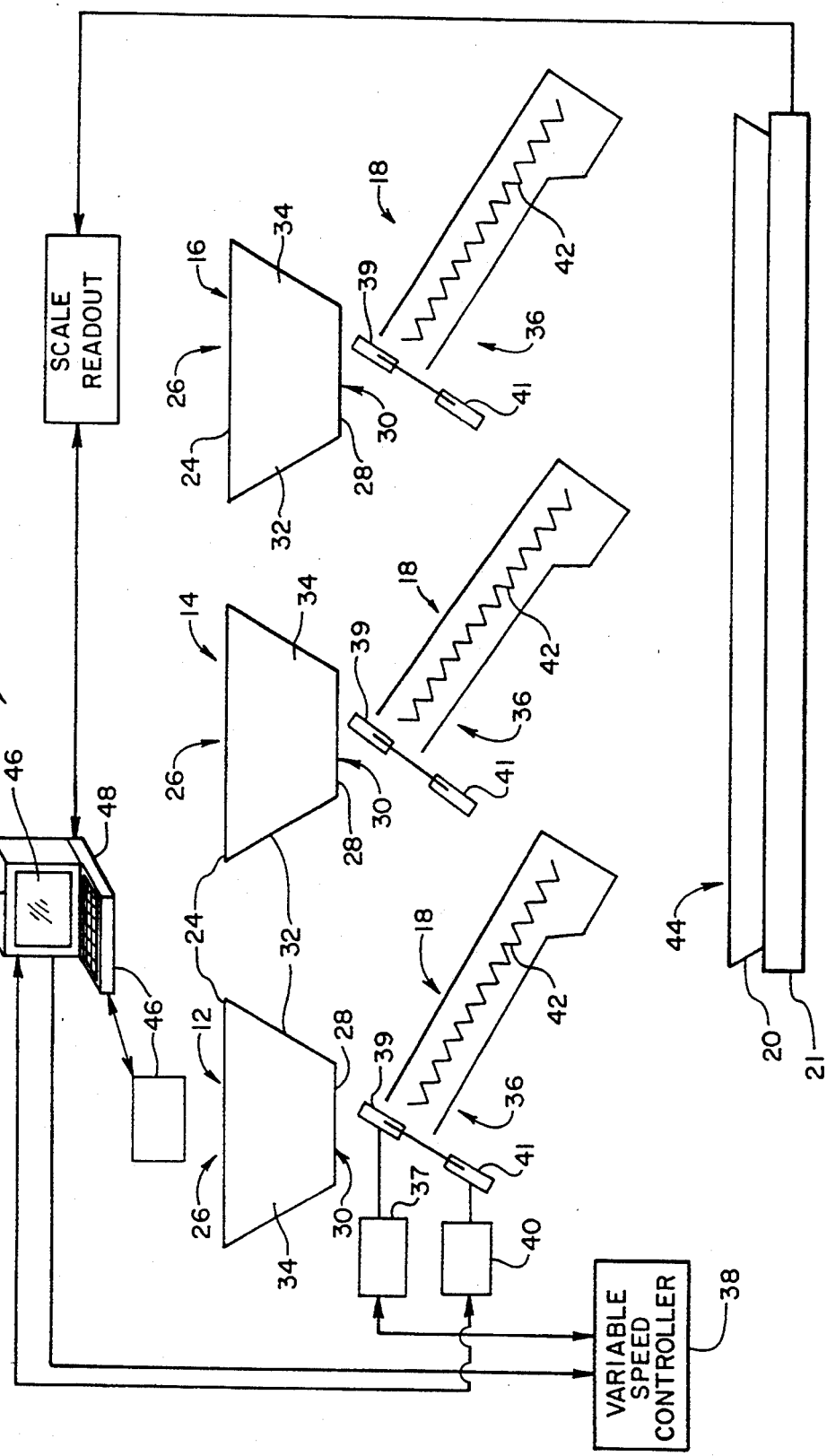
FIG. 1 is a diagram depicting the preferred embodiment of a volumetric blending calibration system in accordance with the present invention.

Reference is now made to the drawings, wherein like reference numerals denote like elements throughout the several views. Referring to FIG. 1, the preferred embodiment of a volumetric blending system 10 broadly includes a plurality of hoppers 12, 14, 16, dispensing mechanism 18, a receptacle 20, scale 21 and a control system 22. In the preferred embodiment, each hopper 12, 14, 16 contains a single ingredient and includes an upper margin 24 defining a fill opening 26, a lower margin 28 defining a dispensing aperture 30 and at least one side wall 32 extending between the upper margin 24 and lower margin 28 defining an ingredient chamber 34. It will be understood that the size, shape and dimensions of the ingredient chamber 34 may vary according to the nature and requirements of the ingredient contained within the chamber 34. For example, the ingredient chamber 34 may be generally conical, cylindrical or rectangular or any combination thereof.

In the preferred embodiment, the dispensing mechanism 18 includes a positive displacement drive 36 operably coupled for coupler 39 to a motor 37, drive controller 38 and pulse feedback device 40. Each displacement drive 36 includes structure defining one or more volumetric units 42 of a generally uniform size. Each displacement drive 36 extends from the dispensing aperture 30 to the receptacle 20 such that the displacement drive 36 can transport the ingredient from the hopper 12, 14, 16 to the receptacle 20. It will be understood that the displacement drives 36 may be, for example, augers or piston pumps or baffled conveyors, depending on the ingredient to be transported from the hopper 12, 14, 16 to the receptacle 20. In another embodiment, each displacement drive 36 extends from the dispensing aperture 30 to a common cross auger (not shown). The cross auger transports the mixed ingredients from each displacement drive 36 to receptacle 20. It also will be understood that the drive controller 38 may be any variable speed drive controller such as, for example, an AC or DC drive controller, servo controller or stepwise speed controller. The pulse feedback device 40 is operably coupled by coupler 41 to the displacement drive 36 and the control system 22 such that the pulse feedback device 40 records the movement of the volumetric units 42 to the receptacle 20.

In the preferred embodiment, the receptacle 20 includes structure defining a receiving cavity 44 for holding a mixture of ingredients. It will be understood that the dimensions, shape and structure of the receptacle 20 may vary according to the viscosity of the ingredients and the intended use of the ingredient mixture. For example, the receptacle 20 may be another hopper or a storage bin or a box of a dump truck. The scale 21 is operably coupled to both the control system 22 and the receptacle 20 such that the scale 21 measures the weight of the ingredients in the receptacle 20 and the control system 22 records that measurement. Scale 21 may be a part of the plant equipment or may be situated to weigh a truck, into which the ingredients are deposited. The weight measured by the scale 21 is typically fed into the control system 22 manually by operator action.

In the preferred embodiment, the control system 22 includes one or more input/output mechanisms 46 coupled to a data processing and storage unit 48. One or more of the input/output mechanisms 46 are operably coupled to the hoppers 12, 14, 16, the dispensing mechanism 18 and the scale 21 such that the control system 22 regulates the operation of the dispensing mechanism 18. One or more of the input/output mechanisms 46 are accessible by an operator of the system 10. It will be understood that the input/output mechanisms 46 will vary depending on the information to be inputted or outputted and may be used for entering data or retrieving data or both entering and retrieving data. For example, a user of the system 10 may input information through a computer keyboard or dial controls and receive information from the system 10 by reading it on a monitor or viewing indicator lights. The data processing and storage unit 48 includes predetermined instructions for processing and storing information received from the input/output mechanisms 46.

In operation, referring to FIG. 2, in the preferred embodiment, the flowchart 50 describes the general steps for calibrating the volumetric blending system 10 by determining a calibration ratio of ingredient weight to movement of the dispensing mechanism 18. To begin, the operator selects the hopper 12 and dispensing mechanism 18 to be calibrated (step 52). The operator clears any ingredient from the dispensing mechanism 18 and checks the amount of ingredient in the selected hopper 12 (step 54). Next, the operator provides the control system 22 with a calibration interval through the input/output mechanism 46 (step 56). In the preferred embodiment, the calibration interval is a predetermined number of calibration pulses. It will be understood that the calibration interval also may be a target weight based on estimated calibration factors.

The control system 22 then instructs the drive controller 38 to move the displacement drive 36 and initiates the dispensing of the ingredient from the ingredient chamber 34 through the dispensing aperture 30 of the hopper 12 to the volumetric units 42 (step 58). The movement of the displacement drive 36 transports the ingredient-filled volumetric units 42 to the receptacle 20 where the ingredient is deposited within the ingredient receiving cavity 44. The control system 22 monitors the number of volumetric units 42 moving to the receptacle 20 by recording and analyzing the pulse information provided by the pulse feedback device 40 until the number of pulses equals the predetermined number of calibration pulses for the calibration interval (step 60). Once the predetermined number of pulses has been reached, the control system 22 halts the movement of the displacement mechanism 18 (step 62). The control system 22 prompts the operator to weigh the total ingredient in the receptacle 20 with the scale 21 and enter that weight into the control system 22 (step 64). The control system 22 determines and stores the calibration ratio of weight to number of pulses and ends (step 66, 68). This calibration process (steps 52–68) is repeated for each hopper 14, 16 until all hoppers 12, 14, 16 are calibrated.

The calibration ratio can be used to calculate the optimum speed of the displacement drive 36 to transport any given quantity or weight of the ingredient into the receptacle 20 as part of a mixture. To calculate the speed of a displacement drive 36 for a desired ingredient quantity, the control system 22 associates the desired ingredient weight to the number of pulses needed according to the calibration ratio and then determines the number of pulses over time to determine the optimum speed of the displacement drive 36.

For example, given the desired ingredient proportions for each ingredient in a particular mixture, the control system 22 can use the calibration ratios for each ingredient's dispensing mechanism 18 to determine the speed at which each dispensing mechanism 18 should run whereby the dispensing mechanisms 18 are run simultaneously and the mixture contains the correct proportions for each ingredient by weight. This determination involves varying the speed of each dispensing mechanism 18 in concert with the speed and initiation of the other dispensing mechanisms 18 so that the dispensing mechanisms 18 bring the desired ingredient quantities simultaneously to the receptacle 20. In another example, the ingredients can be dispensed to the mixture sequentially by calculating the total weight desired without regard to the dispensing mechanism speed for other ingredients.

Once the calibration ratio is known for any particular combination of hopper 12, dispensing mechanism 18 and ingredient, there is no need to re-calibrate for each mixture. A dispensing mechanism 18 for a hopper 12, 14, 16 need only be re-calibrated when the ingredients within the hopper 12 change. Minimizing the need for repeated calibration reduces the time and labor involved in batch mixing. In addition, by matching the ingredient weight to the number of pulses, an operator can begin and end the calibration with any pulse or at any speed of displacement drive 36.

Numerous characteristics and advantages of the invention have been set forth in the foregoing description. It will be understood, of course, that this disclosure is, in many respects, only illustrative. Changes can be made in details, particularly in matters of shape, size and arrangement of parts without exceeding the scope of the invention. The inventions scope is defined in the language in which the appended claims are expressed.

What is claimed is:

1. In a volumetric blending system including a plurality of hoppers, each hopper containing a separate ingredient, speed regulatable dispensing means associated with each hopper for transporting said ingredient into a single receiving member in proportion to the movement of said dispensing means and including a plurality of volumetric units for measuring said ingredient, and drive means for controlling the movement of each dispensing means, scale means for measuring said ingredient in said single receiving member, a method of calibrating the volumetric blending system comprising the steps of:
   (a) initiate movement of said dispensing means and count of volumetric units;
   (b) terminate movement of said dispensing means movement upon completion of predetermined unit count;
   (c) measure and record the quantity of each ingredient dispensed for predetermined unit count of said dispensing means whereby the quantity of the ingredient dispensed for the predetermined unit count provides a calibration ratio of ingredient quantity to movement of said dispensing means.

2. The method of claim 1 further including the steps of:
   (d) calculating the total movement of the dispensing means required to dispense a predetermined second quantity of each ingredient by weight; and
   (e) coordinating the drive means of each dispensing means to dispense the second quantity of each ingredient as a portion of a mix.

3. The method of claim 2, step (e) further including the step of:
   (e1) dispensing said second quanitity of each ingredient to said single receiving member simultaneously.

4. The method of claim 2, step (e) further including the step of:
   (e1) dispensing said second quanitity of each ingredient to said single receiving member sequentially.

5. In a volumetric blending system including a plurality of hoppers coupled to a computer processing system, each hopper containing a separate ingredient and including speed regulatable dispensing means and drive means for controlling the speed of each dispensing means, said dispensing means coupled to each hopper for measuring and transporting said ingredient into a single receiving member in proportion to the speed of said dispensing means, the computer processing system including a plurality of input means for entering data, central processing and storage means, and one or more output means for exiting data, a method of calibrating the volumetric blending device comprising the computer-implemented steps of:
   (a) initiate movement of said dispensing means and count of volumetric units;
   (b) terminate movement of said dispensing means movement upon completion of predetermined unit count;
   (c) measure and record the quantity of each ingredient dispensed for predetermined unit count of said dispensing means whereby the quantity of the ingredient dispensed for the predetermined unit count provides a calibration ratio of ingredient quantity to movement of said dispensing means.

6. The method of claim 5 further including the computer-implemented steps of:
   (d) calculating the total movement of the dispensing means required to dispense a predetermined second quantity of each ingredient by weight; and
   (e) coordinating the drive means of each dispensing means to dispense the second quantity of each ingredient as a portion of a mix.

* * * * *